US012429895B2

(12) United States Patent
Yosef-Hay et al.

(10) Patent No.: US 12,429,895 B2
(45) Date of Patent: Sep. 30, 2025

(54) VOLTAGE OR CURRENT REFERENCE CIRCUIT WITH TEMPERATURE CURVATURE CORRECTION

(71) Applicant: NVIDIA Corporation, Santa Clara, CA (US)

(72) Inventors: Yoni Yosef-Hay, Lyngby (DK); Xiaodong Liu, Lund (SE)

(73) Assignee: NVIDIA Corporation, Santa Clara, CA (US)

( * ) Notice: Subject to any disclaimer, the term of this patent is extended or adjusted under 35 U.S.C. 154(b) by 43 days.

(21) Appl. No.: 18/488,249

(22) Filed: Oct. 17, 2023

(65) Prior Publication Data

US 2025/0123649 A1 Apr. 17, 2025

(51) Int. Cl.
*G05F 3/30* (2006.01)
*G05F 3/24* (2006.01)

(52) U.S. Cl.
CPC ................ *G05F 3/30* (2013.01); *G05F 3/245* (2013.01)

(58) Field of Classification Search
None
See application file for complete search history.

(56) References Cited

U.S. PATENT DOCUMENTS 6,462,527 B1 * 10/2002 Maneatis .................. H03L 7/18 323/315
6,724,176 B1 * 4/2004 Wong ......................... G05F 3/30 327/539
7,688,054 B2 * 3/2010 Cave .......................... G05F 3/30 323/907
8,058,863 B2 * 11/2011 Cho ........................... G05F 3/30 323/315
8,791,685 B2 * 7/2014 Cho ........................... G05F 3/16 327/541
9,397,682 B2 * 7/2016 Dinc ........................ H03M 1/12
10,520,972 B2 * 12/2019 Horng ...................... G05F 3/267
2006/0001412 A1 * 1/2006 Fernald .................... G05F 3/262 323/313
2010/0052643 A1 * 3/2010 Cho ........................... G05F 3/30 323/313

* cited by examiner

*Primary Examiner* — Thomas J. Hiltunen
(74) *Attorney, Agent, or Firm* — Lowenstein Sandler LLP

(57) ABSTRACT

A reference generation circuit includes a proportional-to-absolute temperature (PTAT) current branch having a pair of diodes and a complementary-to-absolute temperature (CTAT) current branch having a pair of resistors. A first bank of diode-connected transistors is positioned in the PTAT branch and a second bank of diode-connected transistors is positioned in the CTAT branch. Diode-connected transistors of the first and second banks of transistors are selectable to tune a gate-source voltage of each of the first and second banks of diode-connected transistors.

22 Claims, 5 Drawing Sheets

VOLTAGE OR CURRENT REFERENCE CIRCUIT WITH TEMPERATURE CURVATURE CORRECTION

TECHNICAL FIELD

At least one embodiment generally pertains to reference generation circuits, and more specifically, but not exclusively, to a voltage or current reference circuit with temperature curvature correction.

BACKGROUND

In many electrical devices or circuits, including integrated circuits, a reference generation circuit is intended to establish a direct-current (DC) voltage or current that has a well-defined behavior with temperature. The well-defined behavior with temperature can be either proportional to absolute temperature (PTAT), complementary to absolute temperature (CTAT), or temperature independent. Reference generation circuits tend to suffer from temperature-induced variations that cause curvature in the voltage or current reference outputs, which means that the voltage or current varies over certain temperature ranges. Ideally, however, the reference current or voltage output is close to flat, regardless of temperature, to provide an unchanging, dependable reference signal within the circuit or device.

BRIEF DESCRIPTION OF DRAWINGS

Various embodiments in accordance with the present disclosure will be described with reference to the drawings, in which.

DETAILED DESCRIPTION

Figure 1A:
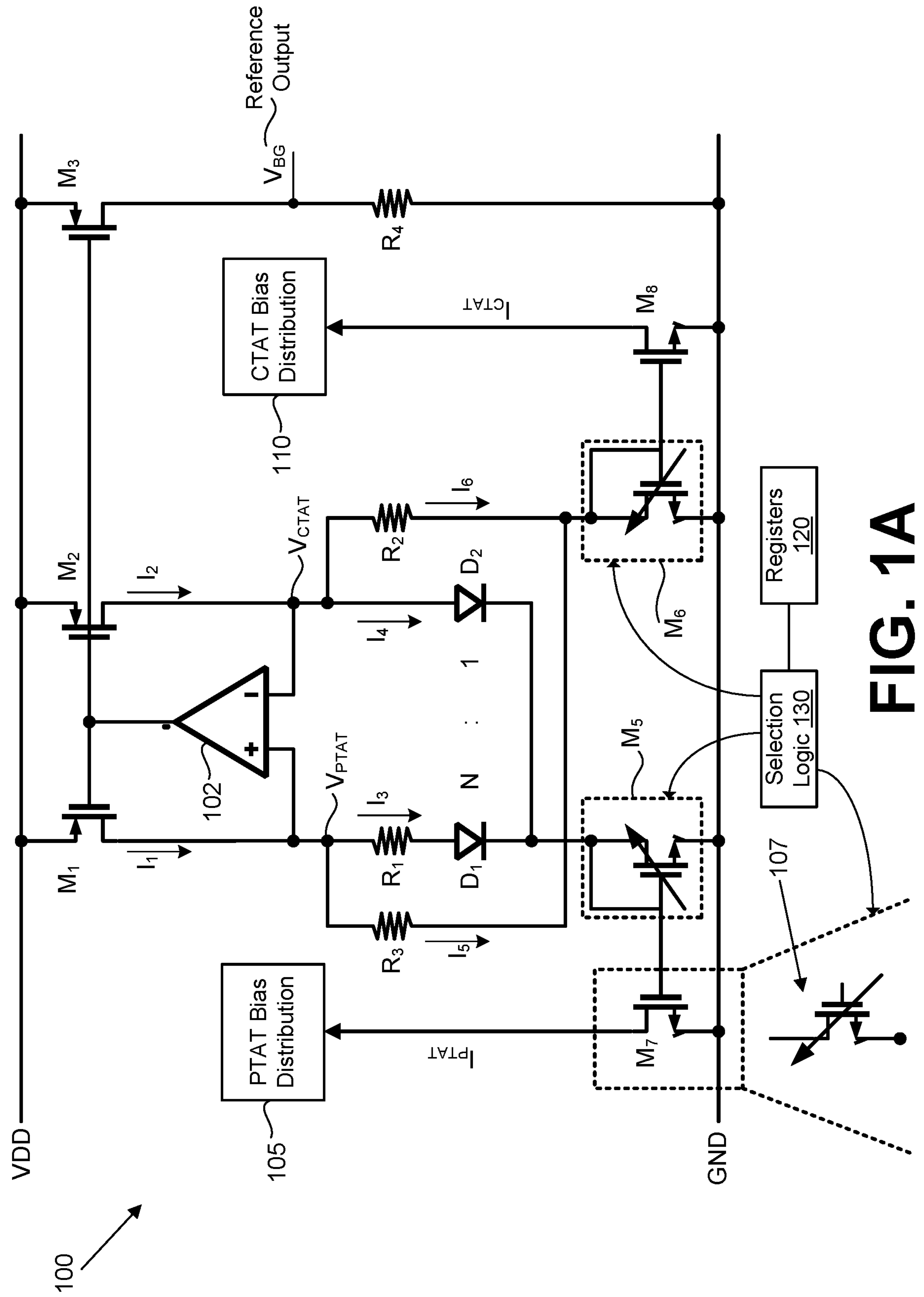
FIGS. 1A-1C are a schematic circuit diagram of an reference generation circuit according to various embodiments.

As described above, present designs of reference generation circuits result in changing reference current or voltage outputs, for which additional design is typically added by way of temperature change compensation. For example, such a reference circuit can be realized by combining two voltage or current quantities having opposite temperature coefficients (TCs) with proper weighting. With two PN-junction diodes at unequal current densities, the forward voltage of one of the diodes may exhibit a negative TC while the difference between the forward voltages of the two diodes may exhibit a positive TC. For example, the reference voltage can be derived by $$V_{REF} = k_1 \times V_{PTAT} + k_2 \times V_{CTAT}$$

where $k_1$ and $k_2$ are the weighting coefficients with zero or low TCs, $V_{PTAT}$ is a PTAT voltage, and $V_{CTAT}$ is a CTAT voltage. In some examples, the weighting coefficients are generated by resistor ratios, for example, and a combination of the negative and positive TCs generate a total temperature coefficient for the reference generation circuit.

For a bandgap reference voltage, the TC is ideally zero. However, due to non-linearity, process variations and mismatch, the bandgap reference voltage usually displays curvature when plotted as a function of temperature and spreads in different process corners. Therefore, curvature correction techniques may be employed to achieve the desired reference accuracy. The curvature correction is generally based on the addition of a tunable non-linear component to the bandgap reference output, such as a resistor network that occupies a large area and introduces interface mismatches. Further, the addition of the non-linear component is complex and usually involves additional voltage-to-current conversion, which consumes extra power. Additionally, the tunable non-linear component is not suitable for low supply voltage operation.

Aspects and embodiments of the present disclosure address the above deficiencies with use of a pair of tunable transistors, one each in a proportional-to-absolute temperature (PTAT) current branch and in a complementary-to-absolute temperature (CTAT) current branch of the reference generation circuit. For example, the PTAT current branch may include a pair of diodes and the CTAT current branch may include a pair of resistors. A first bank of diode-connected transistors may be positioned in the PTAT branch and a second bank of diode-connected transistors may be positioned in the CTAT branch. In these embodiments, diode-connected transistors of the first and second banks of transistors are selectable to tune a gate-source voltage of each of the first and second banks of diode-connected transistors.

In these embodiments, by tuning the gate-source voltage of the first and second banks of diode-connected transistors, a change in gate-source voltage between the first and second banks is altered in a way that compensates for temperature-induced variations in the reference output. More specifically, the tuning of the first and second banks of diode-connected transistors, such as through selecting or deselecting diode-connected transistors of one or more of the first and second banks of diode-connected transistors, adjusts for non-linearity in the bandgap reference voltage (or current) of the reference generation circuit. Further, by mirroring the PTAT and CTAT current branches through additional diode-connected transistors, the PTAT and CTAT currents are readily available, which are missing in the conventional low-voltage bandgap reference topology.

Therefore, advantages of the integrated circuits, systems, and methods implemented in accordance with some embodiments of the present disclosure include, but are not limited to, the implementation of a tunable approach in which voltage quantities are added directly to PN-junction diodes for the PTAT current branch and to resistors of the CTAT current branch. In this way, compensation for temperature-induced variations to the low-voltage bandgap reference is built into the reference generation circuit without need of additional circuitry, providing a low-cost and low-area solution. The nature of the implementation is straight-forward, e.g., not requiring additional complexity of voltage-to-current conversion, and also avoiding extra power consumption. Other advantages will be apparent to those skilled in the art of reference generation circuit design, as will be discussed hereinafter. The disclosed integrated circuits, systems, and methods may be instantiated within a serial deserializer (SERDES), mixed signal processing circuitry, an interconnect, or other circuit design that may employ a reference generation circuit.

Figures 1B, 1C:
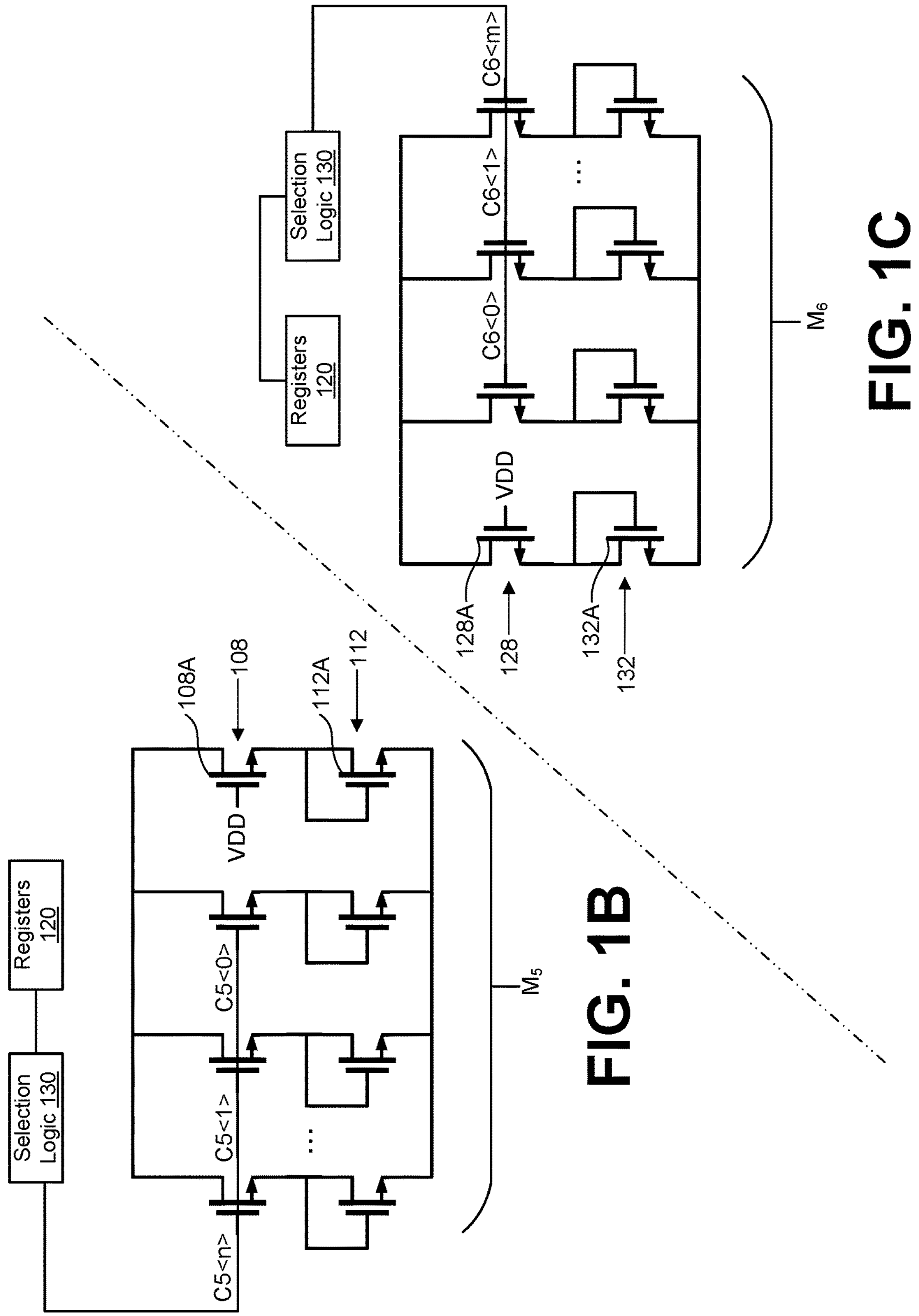

FIGS. 1A-1C are a schematic circuit diagram of an reference generation circuit 100 according to various embodiments. In these embodiments, the reference generation circuit 100 includes an operational amplifier 102 having a positive terminal coupled to a first current source (such as a first supply transistor $M_1$) and a negative terminal coupled to a second current source (such as a second supply transistor $M_2$). In these embodiments, the first current source and the second current source are biased by an output of the operational amplifier. As illustrated, the first and second supply transistors $M_1$ and $M_2$ may be p-type transistors. In some embodiments, the reference generation circuit 100 further includes an output transistor $M_3$, e.g., having a source coupled to a supply voltage (VDD). Gates of the first supply transistor $M_1$, the second supply transistor $M_2$, and the output transistor $M_3$ may be interconnected and sources of each of the first and second supply transistors may also be coupled to the supply voltage. In at least one embodiment, the reference generation circuit 100 includes an output resistor $R_4$ coupled to a drain of the output transistor, where a voltage across the output resistor is an output reference voltage, also referred to herein as the bandgap reference voltage $V_{BG}$.

In at least some embodiments, the reference generation circuit 100 further includes, e.g., in the PTAT current branch, a first diode $D_1$, of a pair of PN-junction diodes, and a resistor $R_1$ (e.g., a PTAT resistor) coupled between the positive terminal and the first diode $D_1$. The PTAT current branch may further include a second diode $D_2$, of the pair of PN-junction diodes, coupled to the negative terminal. In some embodiments, the pair of PN-junction diodes are also diode-connected transistors. In various embodiments, the reference generation circuit 100 further includes a first bank of diode-connected transistors $M_5$ positioned in the PTAT current branch, e.g., coupled between the first and the second diodes and ground. In some embodiments, the ground terminal is coupled to additional circuitry that is in turn coupled to ground, for example.

In at least some embodiments, the reference generation circuit 100 further includes, e.g., in the CTAT current branch, a first resistor $R_3$, of a pair of resistors, coupled to the positive terminal. In these embodiments, the reference generation circuit 100 further includes a second resistor $R_2$, of the pair of resistors, coupled to the negative terminal. In at least some embodiments, the reference generation circuit 100 further includes a second bank of diode-connected transistors $M_6$ positioned in the CTAT current branch, e.g., coupled between the first and second resistors $R_2$ and $R_3$ and the ground.

In various embodiments, diode-connected transistors of the first and second banks of transistors $M_5$ and $M_6$ are selectable to tune a gate-source voltage ($V_{GS}$) of each of the first and second banks of diode-connected transistors $M_5$ and $M_6$, although the tuning may be performed on only one of the first and second banks of transistors $M_5$ and $M_6$ in some embodiments to achieve a desired change in gate-source voltage between the first and second banks of transistors $M_5$ and $M_6$. In some embodiments, as will be explained in more detail, a first tuned gate-source voltage of the first bank of diode-connected transistors $M_5$ also tunes a CTAT current passing through a combination of the first and second resistors R2 and R3. Further, a second tuned gate-source voltage of the second bank of diode-connected transistors $M_6$ also tunes the CTAT current passing through a combination of the first and second resistors.

As illustrated in FIG. 1B, in at least one embodiment, the first bank of diode-connected transistors $M_5$ includes a plurality of transistor switches 108 and a plurality of diode-connected transistors 112, each coupled to a respective transistor switch of the plurality of transistor switches 108. In at least some embodiments, a first transistor switch 108A of the plurality of transistor switches 108 is coupled to the supply voltage (VDD) to provide a minimum coarse gate-source voltage from a first diode-connected transistor 112A of the plurality of diode-connected transistors 112, e.g., by way of an initial default starting point for a first $V_{GS}$. In some embodiments, the plurality of diode-connected transistors 112 vary in size to provide an increasingly fine adjustment, when selected, to the gate-source voltage $V_{GS}$ of the first bank of diode-connected transistors $M_5$.

As illustrated in FIG. 1C, the second bank of diode-connected transistors $M_6$ includes a plurality of transistor switches 128 and a plurality of diode-connected transistors 132, each coupled to a respective transistor switch of the plurality of transistor switches 108. In at least some embodiments, a first transistor switch 128A of the plurality of transistor switches 128 is coupled to the supply voltage (VDD) to provide a minimum coarse gate-source voltage from a first diode-connected transistor 132A of the plurality of diode-connected transistors 132, e.g., by way of an initial default starting point for a second $V_{GS}$. In some embodiments, the plurality of diode-connected transistors 132 vary in size to provide an increasingly fine adjustment, when selected, to the gate-source voltage $V_{GS}$ of the second bank of diode-connected transistors $M_6$. In at least some embodiments, the diode-connected transistors of the plurality of transistors switches 108 and 128 and of the plurality of diode-connected transistors 112 and 132 are n-type transistors.

With additional reference to FIGS. 1B-1C, the reference generation circuit 100 further includes one or more registers 120 to store a plurality of digital control bits in some embodiments. In some embodiments, the registers 120 are programmed via firmware or software associated with the circuitry of the reference generation circuit 100, e.g., before or after manufacturing. For example, the firmware or software may be executed on a graphics processing unit (GPU), as encryption circuitry or modules, a data processing unit (DPU), and/or a remote direct memory access (RDMA) unit, listed only by way of example.

In these embodiments, the reference generation circuit 100 further includes selection logic 130 to translate the plurality of digital control bits, read from the one or more registers 120, into a switch selection of one or more diode-connected transistors from each of the first and second banks of diode-connected transistors $M_5$ and $M_6$. For example, these digital bits may be or correspond to C5<n: 0> bits for the first bank of diode-connected transistors $M_5$ (FIG. 1B) and C6<m: 0> bits for the second bank of diode-connected transistors $M_6$ (FIG. 1C).

In some embodiments, the reference generation circuit 100 further includes a PTAT transistor $M_7$ having a gate coupled to gates of selected diode-connected transistors of the first bank of diode-connected transistors $M_5$. In embodiments, the PTAT transistor $M_7$ mirrors an output of the PTAT current ($I_{PTAT}$), e.g., to a PTAT bias distribution 105, which may provide the PTAT current to particular circuitry requiring the PTAT current as reference.

In some embodiments, because tuning the gate-source voltage ($V_{GS}$) of the first bank of diode-connected transistors $M_5$ may alter the mirrored PTAT current, the PTAT transistor $M_7$ can be implemented as a bank of PTAT transistors 107 having gates coupled to gates of selected diode-connected transistors of the first bank of diode-connected transistors $M_5$. For example, the bank of PTAT transistors 107 may be designed similar to (or the same as) $M_5$ or $M_6$ in various embodiments, with separate digital control bits that may also be controlled by the selection logic 130. In some embodiments, the PTAT transistors of the bank of PTAT transistors 107 are selectable to mirror an output of the PTAT current and that compensates for the change in gate-source voltage of the first bank of diode-connected transistors $M_5$, e.g., according to an $M_5$:$M_7$ ratio of selected transistors.

In some embodiments, the reference generation circuit 100 further includes a CTAT transistor $M_8$ having a gate coupled to gates of selected diode-connected transistors of the second bank of diode-connected transistors $M_6$. In embodiments, the CTAT transistor $M_8$ mirrors an output of the CTAT current ($I_{CTAT}$), e.g., to a CTAT bias distribution 110, which may provide the CTAT current to particular circuitry requiring the CTAT current as reference.

To understand the reference generation circuit 100 in further depth, in some embodiments, the CTAT voltage ($V_{CTAT}$) is the forward-biased voltage of the second diode $D_2$, denoted as $V_{BE2}$ and the PTAT voltage ($V_{PTAT}$) is the difference of the forward-biased voltages between diodes $D_2$ and $D_1$, $V_{BE2}$-$V_{BE1}$, denoted as $\Delta V_{BE}$. In these embodiments, the $\Delta V_{BE}$ is thus the voltage across the resistor $R_1$. Assuming resistors $R_2$ and $R_3$ are of equal resistance, and transistors $M_1$, $M_2$, and $M_3$ are of equal size, the bandgap reference voltage $V_{BG}$ may be derived as $$V_{BG} = \frac{R_4}{R_1}\Delta V_{BE} + \frac{R_4}{R_2}V_{BE2}$$

with the first diode $D_1$ sized to be N times larger than the second diode $D_2$, and $\Delta V_{BE}$ that can be further derived as $$\Delta V_{BE} = V_T \ln(N)$$

$$V_T = \frac{kT}{q},$$

where T is the absolute temperature, k is the Boltzmann constant, and q is the magnitude of the electrical charge on an electron.

Figure 2A:
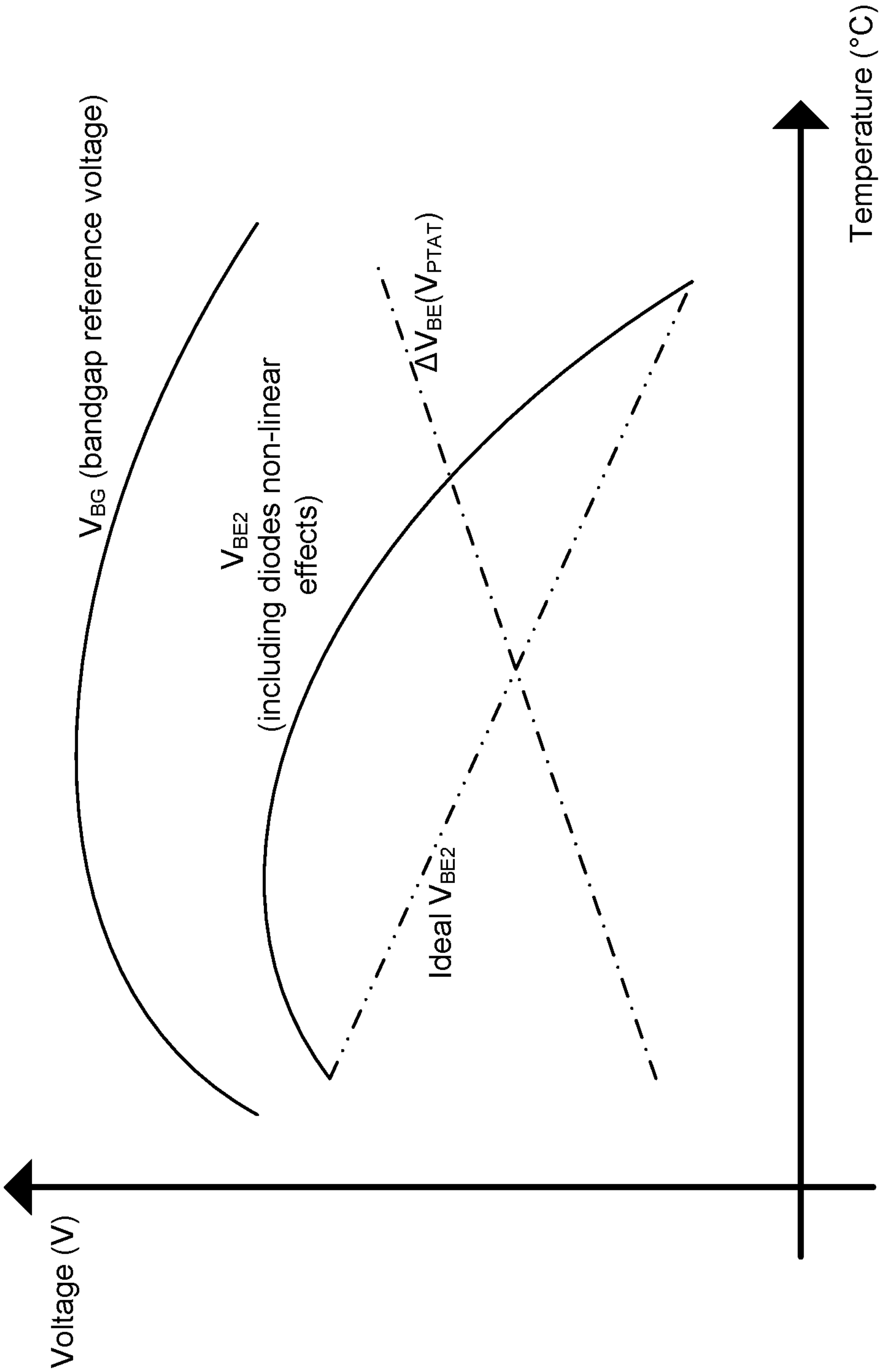
FIG. 2A Prior Art
FIG. 2A is a graph illustrating the curvature in voltage versus temperature curve for a bandgap reference voltage output by typical reference generation circuit.

FIG. 2A is a graph illustrating the curvature in voltage versus temperature curve for a bandgap reference voltage output by typical reference generation circuit. Ideally, one would expect both $\Delta V_{BE}$ (single-dotted line) and $V_{BE2}$ (double-dotted line) to be linear with respect to the temperature changes so that the reference generation circuit gets a constant reference voltage versus the temperature. However, since $V_{BE2}$ usually exhibits more non-linearities (solid black curve) compared with the $\Delta V_{BE}$ curve, the resultant reference voltage $V_{BG}$ exhibits curvature from the ideal constant line for $\Delta V_{BE}$.

With additional reference to the disclosed reference generation circuit 100 illustrated in FIGS. 1A-1C, assuming $M_1$ and $M_2$ are equal size, $R_2$ and $R_3$ are equal value, the following expressions may be derived:

$$\Delta V_{BE} = V_{BE2} - V_{BE1}$$

-continued $$\Delta V_{GS} = V_{GS5} - V_{GS6}$$

$$\begin{aligned} I_1 = I_2 = I_3 + I_5 = I_4 + I_6 \\ = \frac{\Delta V_{BE}}{R_1} + \frac{V_{BE2} + V_{GS5} - V_{GS6}}{R_2} \\ = \frac{\Delta V_{BE}}{R_1} + \frac{V_{BE2} + \Delta V_{GS}}{R_2} \\ = \frac{V_T \ln(N)}{R_1} + \frac{V_{BE2} + \Delta V_{GS}}{R_2}. \end{aligned}$$

In these embodiments, $$I_3 = I_4 = \frac{V_T \ln(N)}{R_1}$$

currents flow through the first diode $D_1$ and the second $D_2$, respectively, making up the PTAT current that is fixed based on values of N, $R_1$, and $V_T$. Further, $$I_5 = I_6 = \frac{V_{BE2} + \Delta V_{GS}}{R_2}$$

currents flow through $R_2$ and $R_3$, respectively. Thus, the following voltage and current expressions can be approximated as follows:

$$V_{BG} \propto R_4 \times \left(\frac{V_T \ln(N)}{R_1} + \frac{V_{BE2} + \Delta V_{GS}}{R_2}\right)$$

$$I_{PTAT} \propto (I_3 + I_4) \propto \frac{V_T \ln(N)}{R_1}$$

$$I_{CTAT} \propto (I_5 + I_6) \propto \frac{V_{BE2} + \Delta V_{GS}}{R_2}.$$

Figure 2B:
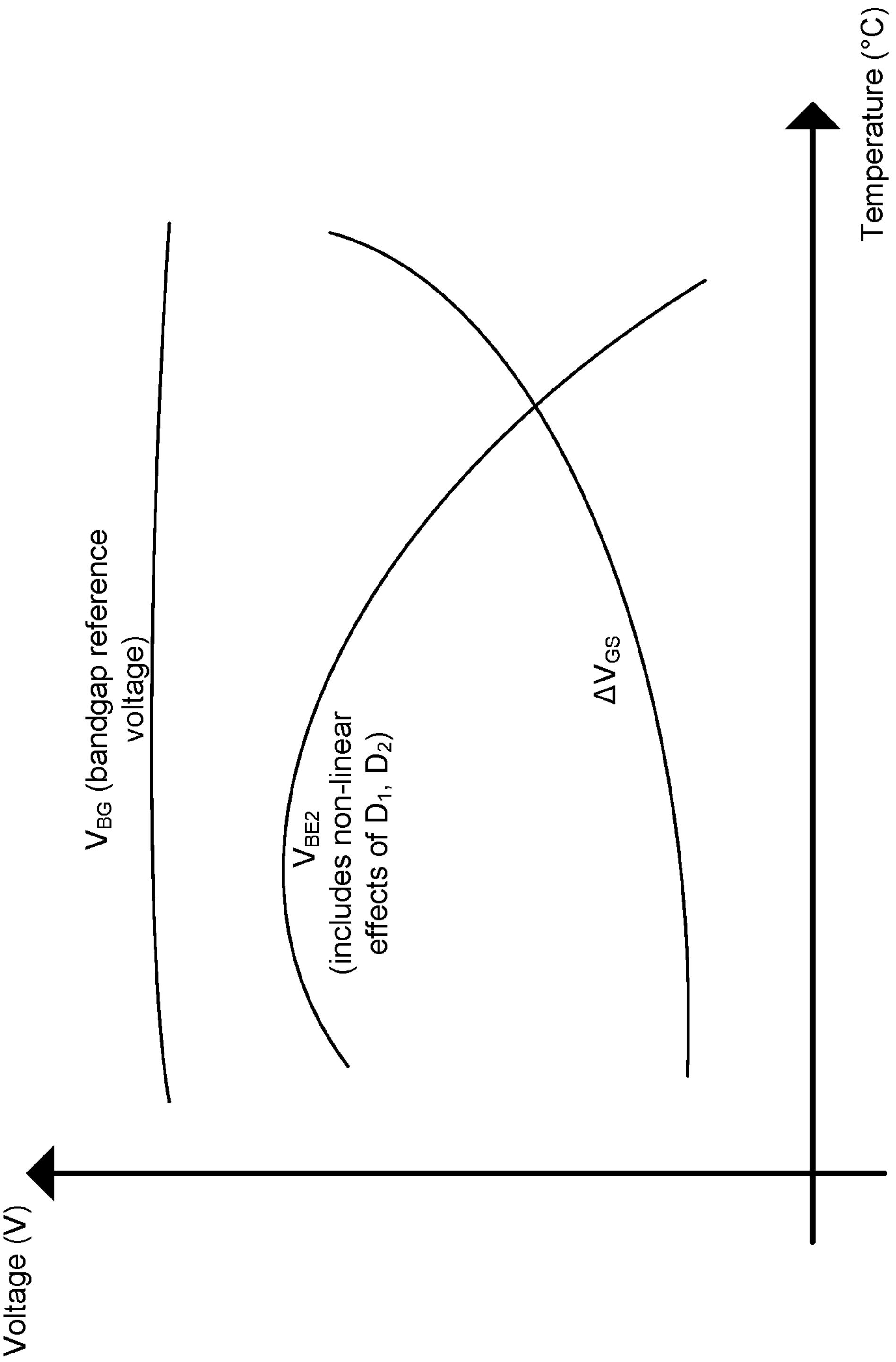
FIG. 2B is a graph illustrating a flattening of the voltage versus temperature curve for the bandgap reference voltage according to at least some embodiments.

FIG. 2B is a graph illustrating a flattening of the voltage versus temperature curve for the bandgap reference voltage $V_{BG}$ according to at least some embodiments. In various embodiments, by tuning the control bits C5<n: 0> and C6<m: 0> (FIGS. 1B-1C), the control logic 130 also tunes the $\Delta V_{GS}$ value, thus adjusting the non-linearities of $\Delta V_{GS}$ in the opposite sign of $V_{BE2}$. In this way, the overall non-linearities of the combination of $V_{BE}2+\Delta V_{GS}$ are reduced, which results in reduced curvature in the bandgap reference voltage $V_{BG}$, as illustrated.

In various embodiments, the bandgap reference voltage ($V_{BG}$) can be derived and its behavior at the different voltages, $V_T$, $V_{BE2}$ and $\Delta V_{GS}$ be observed to understand how to adjust the temperature curve and the effect of the added tunable transistors $M_5$ and $M_6$, as follows:

$$\frac{\partial V_{BG}}{\partial T} = \frac{R_4 \ln(N)}{R_1}\left(\frac{\partial V_T}{\partial T}\right) + \frac{R_4}{R_2}\left(\frac{\partial V_{BE2}}{\partial T} + \frac{\partial \Delta V_{GS}}{\partial T}\right)$$

$$\frac{\partial V_T}{\partial T} = \frac{k}{q} = \frac{1.38 * 10^{-23}}{1.602 * 10^{-19}} \sim 0.086 \text{ mV/C}$$

$$\frac{\partial V_{BE2}}{\partial T} \sim -1.8 \frac{\text{mV}}{\text{C}} @70 \text{ C (depending on process)}$$

$$\frac{\partial \Delta V_{GS}}{\partial T} \sim$$

-continued $$0.348\ \frac{\text{mV}}{\text{C}}\ @70\ \text{C (depending on transistor size and tunning bits).}$$

For example, $$\frac{\partial V_{BG}}{\partial T}$$

is tunable and can be observed through simulations to know how best to configure (or program) the digital control bits within the registers 120. Thus, in differing embodiments, what matters is not only the $$\frac{\partial V_{BE2}}{\partial T}$$

and $$\frac{\partial \Delta V_{GS}}{\partial T}$$

at a discrete temperature, but the variation of these derivatives across a temperature range of typical and expected operation of the reference generation circuit 100. A temperature range, for example, may be between 27 and 70 degrees Celsius or between 20 and 80 degrees Celsius or other expected operational temperature range in varying embodiments.

Figure 3:
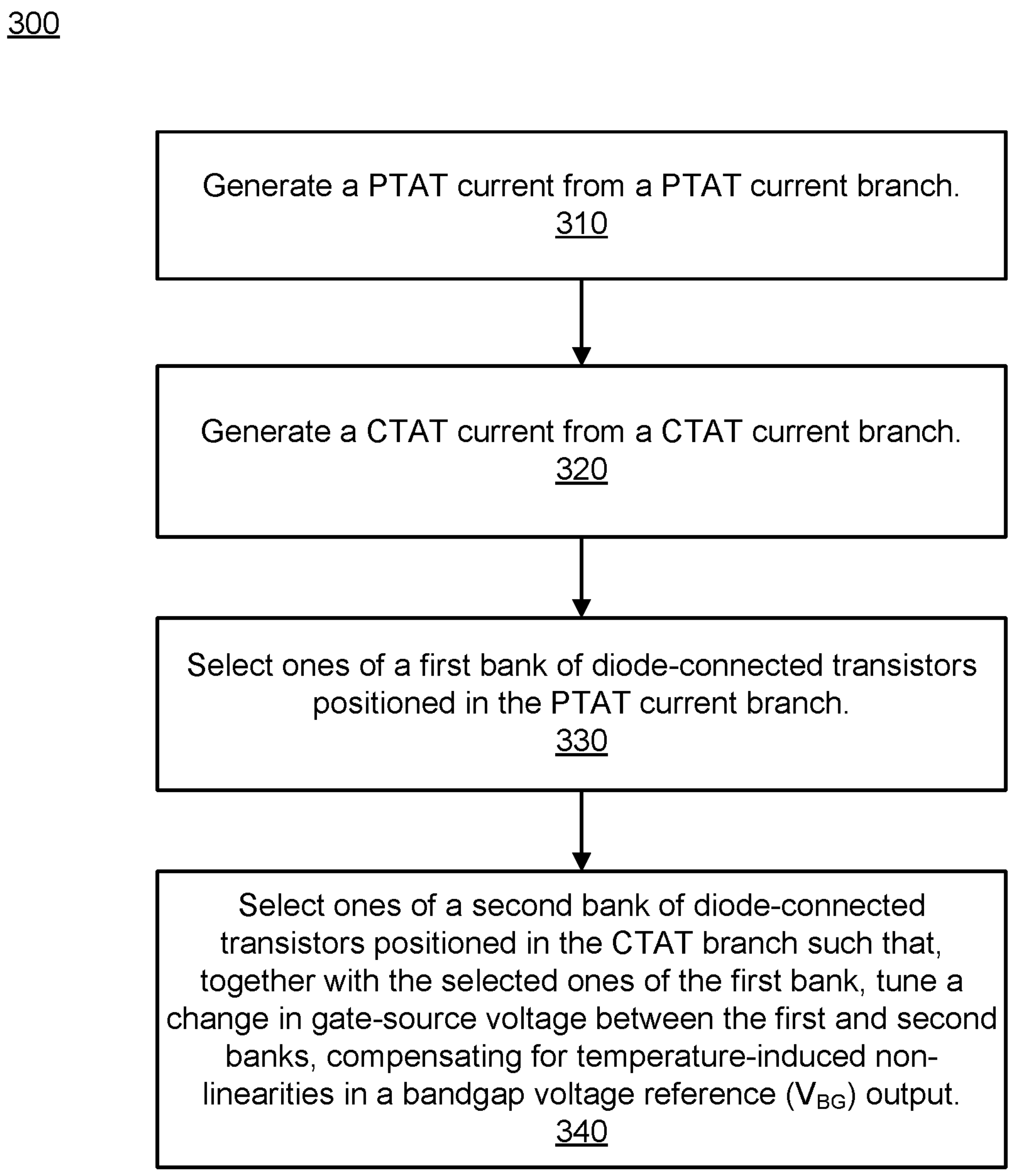
FIG. 3 is a flow chart of an example method for operating the reference generation circuit of FIGS. 1A-1C according to some embodiments.

FIG. 3 is a flow chart of an example method 300 for operating the reference generation circuit of FIGS. 1A-1C according to some embodiments. The method 300 can be performed by processing logic comprising hardware, software, firmware, or any combination thereof. For example, the method 300 can be performed by the reference generation circuit 100, to include the circuitry components, the registers 120, and the control logic 130 (see FIGS. 1A-1C).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic generates a PTAT current from a PTAT current branch.

At operation 320, the processing logic generates a CTAT current from a CTAT current branch.

At operation 330, the processing logic selects one or more diode-connected transistors of the first bank of diode-connected transistors $M_5$ positioned in the PTAT current branch.

At operation 340, the processing logic selects one or more diode-connected transistors of the second bank of diode-connected transistors $M_6$ positioned in the CTAT branch.

In various embodiments, the selection of diode-connected transistors from the first and/or second banks of diode-connected transistors $M_5$ and $M_6$ at operations 330 and 340 are such that the processing logic tunes a change in gate-source voltage ($\Delta V_{GS}$) between the first and second banks of diode-connected transistors $M_5$ and $M_6$, thus compensating for temperature-induced non-linearities in the bandgap voltage reference ($V_{BG}$) output.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms “a” and “an” and “the” and similar referents in the context of describing disclosed embodiments (especially in the context of following claims) are to be construed to cover both singular and plural, unless otherwise indicated herein or clearly contradicted by context, and not as a definition of a term. Terms “comprising,” “having,” “including,” and “containing” are to be construed as open-ended terms (meaning “including, but not limited to,”) unless otherwise noted. “Connected,” when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term “set” (e.g., “a set of items”) or “subset” unless otherwise noted or contradicted by context, is to be construed as a nonempty collection comprising one or more members. Further, unless otherwise noted or contradicted by context, the term “subset” of a corresponding set does not necessarily denote a proper subset of the corresponding set, but subset and corresponding set may be equal.

Conjunctive language, such as phrases of the form “at least one of A, B, and C,” or “at least one of A, B and C,” unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases “at least one of A, B, and C” and “at least one of A, B and C” refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term “plurality” indicates a state of being plural (e.g., “a plurality of items” indicates multiple items). In at least one embodiment, the number of items in a plurality is at least two, but can be more when so indicated either explicitly or by context. Further, unless stated otherwise or otherwise clear from context, the phrase “based on” means “based at least in part on” and not “based solely on.”

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A reference generation circuit comprising:

a proportional-to-absolute temperature (PTAT) current branch having a pair of diodes;

a complementary-to-absolute temperature (CTAT) current branch having a pair of resistors;

a first bank of diode-connected transistors positioned in the PTAT current branch; and a second bank of diode-connected transistors positioned in the CTAT current branch, wherein diode-connected transistors of the first and second banks of transistors are selectable to tune a gate-source voltage of each of the first and second banks of diode-connected transistors.

2. The reference generation circuit of claim 1, further comprising:

an operational amplifier having a positive terminal coupled to a first current source and a negative terminal coupled to a second current source;

a first diode, of the pair of diodes, and a resistor coupled to the positive terminal; and a second diode, of the pair of diodes, coupled to the negative terminal, wherein the first bank of diode-connected transistors is coupled between the first and the second diodes and ground.

3. The reference generation circuit of claim 2, wherein a first tuned gate-source voltage of the first bank of diode-connected transistors also tunes a CTAT current passing through a combination of the first and second resistors, further comprising a bank of PTAT transistors having gates coupled to gates of selected diode-connected transistors of the first bank of diode-connected transistors, wherein PTAT transistors of the bank of PTAT transistors are selectable to mirror an output of the PTAT current.

4. The reference generation circuit of claim 1, further comprising:

an operational amplifier having a positive terminal coupled to a first current source and a negative terminal coupled to a second current source;

a first resistor, of the pair of resistors, coupled to the positive terminal; and a second resistor, of the pair of resistors, coupled to the negative terminal, wherein the second bank of diode-connected transistors is coupled between the first and second resistors and ground.

5. The reference generation circuit of claim 4, wherein a second tuned gate-source voltage of the second bank of diode-connected transistors also tunes a CTAT current passing through a combination of the first and second resistors, further comprising a CTAT transistor having a gate coupled to gates of selected diode-connected transistors of the second bank of diode-connected transistors, wherein the CTAT transistor is to mirror an output of the CTAT current.

6. The reference generation circuit of claim 1, further comprising:

an operational amplifier having a positive terminal coupled to a first supply transistor and a negative terminal coupled to a second supply transistor, further comprising:

an output transistor coupled to a supply voltage, wherein gates of the first supply transistor, the second supply transistor, and the output transistor are interconnected; and an output resistor coupled to a drain of the output transistor, wherein a voltage across the output resistor comprises an output reference voltage.

7. The reference generation circuit of claim 1, further comprising:

one or more registers to store a plurality of digital control bits; and selection logic to translate the plurality of digital control bits, read from the one or more registers, into a switch selection of one or more diode-connected transistors from each of the first and second banks of diode-connected transistors.

8. The reference generation circuit of claim 1, wherein at least one of the first bank of diode-connected transistors or the second bank of diode-connected transistors comprises:

a plurality of transistor switches; and a plurality of diode-connected transistors, each coupled to a respective transistor switch of the plurality of transistor switches, wherein a first transistor switch of the plurality of transistor switches is coupled to a supply voltage to provide a minimum coarse gate-source voltage from a first diode-connected transistor of the plurality of diode-connected transistors.

9. The reference generation circuit of claim 8, wherein the plurality of diode-connected transistors vary in size to provide an increasingly fine adjustment, when selected, to the gate-source voltage.

10. A reference generation circuit comprising:

an operational amplifier having a positive terminal coupled to a first current source and a negative terminal coupled to a second current source, wherein the first current source and the second current source are biased by an output of the operational amplifier;

a first diode coupled to the positive terminal;

a second diode coupled to the negative terminal; and a first bank of diode-connected transistors coupled between the first and the second diodes and ground, wherein diode-connected transistors of the first bank of diode-connected transistors are selectable to tune a gate-source voltage of the first bank of diode-connected transistors.

11. The reference generation circuit of claim 10, wherein the first current source comprises a first supply transistor coupled between a supply voltage and the positive terminal and the second current source comprises a second supply transistor coupled between the supply voltage and the negative terminal, further comprising:

an output transistor coupled to the supply voltage, wherein gates of the first supply transistor, the second supply transistor, and the output transistor are interconnected; and an output resistor coupled to a drain of the output transistor, wherein a voltage across the output resistor comprises an output reference voltage.

12. The reference generation circuit of claim 10, further comprising a bank of PTAT transistors having gates coupled to gates of selected diode-connected transistors of the first bank of diode-connected transistors, wherein PTAT transistors of the bank of PTAT transistors are selectable to mirror an output of the PTAT current.

13. The reference generation circuit of claim 10, further comprising:

one or more registers to store a plurality of digital control bits; and selection logic to translate the plurality of digital control bits, read from the one or more registers, into a switch selection of one or more diode-connected transistors from the first bank of diode-connected transistors.

14. The reference generation circuit of claim 10, wherein the first bank of diode-connected transistors comprises:

a plurality of transistor switches; and a plurality of diode-connected transistors, each coupled to a respective transistor switch of the plurality of transistor switches, wherein a first transistor switch of the plurality of transistor switches is coupled to a supply voltage to provide a minimum coarse gate-source voltage from a first diode-connected transistor of the plurality of diode-connected transistors.

15. The reference generation circuit of claim 14, wherein the plurality of diode-connected transistors vary in size to provide an increasingly fine adjustment, when selected, to the gate-source voltage.

16. The reference generation circuit of claim 10, further comprising:

a first resistor coupled to the positive terminal;

a second resistor coupled to the negative terminal;

a third resistor coupled between the positive terminal and the first diode; and a second bank of diode-connected transistors coupled to the first and second resistors, wherein diode-connected transistors of the second bank of diode-connected transistors are selectable to tune the gate-source voltage of the second bank of diode-connected transistors.

17. A reference generation circuit comprising:

an operational amplifier having a positive terminal coupled to a first current source and a negative terminal coupled to a second current source, wherein the first current source and the second current source are biased by an output of the operational amplifier;

a first resistor coupled to the positive terminal;

a second resistor coupled to the negative terminal; and a first bank of diode-connected transistors coupled between the first and second resistors and ground, wherein diode-connected transistors of the first bank of diode-connected transistors are selectable to tune a gate-source voltage of the first bank of diode-connected transistors.

18. The reference generation circuit of claim 17, wherein the first current source comprises a first supply transistor coupled between a supply voltage and the positive terminal and the second current source comprises a second supply transistor coupled between the supply voltage and the negative terminal, further comprising:

an output transistor coupled to the supply voltage, wherein gates of the first supply transistor, the second supply transistor, and the output transistor are interconnected; and an output resistor coupled to a drain of the output transistor, wherein a voltage across the output resistor comprises an output reference voltage.

19. The reference generation circuit of claim 17, wherein the tuned gate-source voltage of the first bank of diode-connected transistors also tunes a complementary-to-absolute temperature (CTAT) current passing through a combination of the first and second resistors, further comprising a CTAT transistor having a gate coupled to gates of selected diode-connected transistors of the first bank of diode-connected transistors, wherein the CTAT transistor is to mirror an output of the CTAT current.

20. The reference generation circuit of claim 17, further comprising:

one or more registers to store a plurality of digital control bits; and selection logic to translate the plurality of digital control bits, read from the one or more registers, into a switch selection of one or more diode-connected transistors from the first bank of diode-connected transistors.

21. The reference generation circuit of claim 17, wherein the first bank of diode-connected transistors comprises:

a plurality of transistor switches; and a plurality of diode-connected transistors, each coupled to a respective transistor switch of the plurality of transistor switches, wherein a first transistor switch of the plurality of transistor switches is coupled to a supply voltage to provide a minimum coarse gate-source voltage from a first diode-connected transistor of the plurality of diode-connected transistors.

22. The reference generation circuit of claim 21, wherein the plurality of diode-connected transistors vary in size to provide an increasingly fine adjustment, when selected, to the gate-source voltage.

* * * * *